United States Patent
Ash et al.

(10) Patent No.: US 9,632,945 B2
(45) Date of Patent: Apr. 25, 2017

(54) DESTAGE GROUPING FOR SEQUENTIAL FAST WRITE TRACKS

(71) Applicant: INTERNATIONAL BUSINESS MACHINES CORPORATION, Armonk, NY (US)

(72) Inventors: Kevin J. Ash, Tucson, AZ (US); Lokesh M. Gupta, Tucson, AZ (US); Matthew J. Kalos, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 158 days.

(21) Appl. No.: 14/077,924

(22) Filed: Nov. 12, 2013

(65) Prior Publication Data

US 2015/0134914 A1    May 14, 2015

(51) Int. Cl.
| | | |
|---|---|---|
| G06F 12/00 | (2006.01) |
| G06F 12/0891 | (2016.01) |
| G06F 12/121 | (2016.01) |
| G06F 12/122 | (2016.01) |
| G06F 12/0866 | (2016.01) |
| G06F 12/123 | (2016.01) |

(52) U.S. Cl.
CPC ...... *G06F 12/0891* (2013.01); *G06F 12/0866* (2013.01); *G06F 12/121* (2013.01); *G06F 12/122* (2013.01); *G06F 12/123* (2013.01); *G06F 2212/69* (2013.01)

(58) Field of Classification Search
None
See application file for complete search history.

(56) References Cited

U.S. PATENT DOCUMENTS

| | | | |
|---|---|---|---|
| 5,542,066 A * | 7/1996 | Mattson et al. | 711/136 |
| 5,636,359 A * | 6/1997 | Beardsley et al. | 711/122 |
| 5,717,888 A * | 2/1998 | Candelaria et al. | 711/113 |
| 5,734,861 A * | 3/1998 | Cohn et al. | 711/134 |
| 6,192,450 B1* | 2/2001 | Bauman et al. | 711/135 |
| 6,425,050 B1* | 7/2002 | Beardsley et al. | 711/113 |
| 6,738,865 B1* | 5/2004 | Burton et al. | 711/133 |
| 2003/0105928 A1* | 6/2003 | Ash et al. | 711/136 |
| 2008/0040553 A1* | 2/2008 | Ash et al. | 711/133 |
| 2011/0191534 A1* | 8/2011 | Ash et al. | 711/113 |
| 2011/0231369 A1* | 9/2011 | Kawamura et al. | 707/659 |
| 2012/0303872 A1 | 11/2012 | Benhase et al. | |
| 2014/0143505 A1* | 5/2014 | Sim et al. | 711/143 |

* cited by examiner

*Primary Examiner* — Midys Rojas
*Assistant Examiner* — Stephanie Wu
(74) *Attorney, Agent, or Firm* — Griffiths & Seaton PLLC (57) ABSTRACT

An amount of sequential fast write (SFW) Tracks are metered by providing an adjustable threshold for performing a destage scan that moves the SFW tracks from a SFW least recently used (LRU) list to a destaging wait list (DWL). Priorities are set for the destaging of the SFW tracks from the DWL.

18 Claims, 7 Drawing Sheets

DESTAGE GROUPING FOR SEQUENTIAL FAST WRITE TRACKS

BACKGROUND OF THE INVENTION

Field of the Invention

The present invention relates in general computing systems, and more particularly to, systems and methods for destage grouping for sequential fast write tracks.

Description of the Related Art

In today's society, computer systems are commonplace. Computer systems may be found in the workplace, at home, or at school. Computer systems may include data storage systems, or disk storage systems, to process and store data. Contemporary computer storage systems are known to destage storage tracks from cache to long-term storage devices so that there is sufficient room in the cache for data to be written. When destaging the storage tracks, contemporary storage systems destage the storage tracks from each rank in the cache when the cache is becoming full or the global pressure factor is high. That is, storage tracks are destaged from each rank when the global pressure factor is high, even though some ranks in the cache may only be storing a small number of storage tracks with respect to the amount of storage space allocated to these ranks. Moreover, destaging tasks assist with starting the destaging of storage tracks to the storage systems.

SUMMARY OF THE INVENTION

In one embodiment, a method is provided for destage grouping for sequential fast write tracks using a processor device in a computing environment. In one embodiment, by way of example only, an amount of sequential fast write (SFW) tracks are metered by providing an adjustable threshold for performing a destage scan that moves the SFW tracks from a SFW least recently used (LRU) list to a destaging wait list (DWL). Priorities are set for the destaging of the SFW tracks from the DWL.

In another embodiment, a computer system is provided for destage grouping for sequential fast write tracks using a processor device, in a computing environment. The computer system includes a computer-readable medium and a processor in operable communication with the computer-readable medium. In one embodiment, by way of example only, the processor meters an amount of sequential fast write (SFW) tracks by providing an adjustable threshold for performing a destage scan that moves the SFW tracks from a SFW least recently used (LRU) list to a destaging wait list (DWL). Priorities are set for the destaging of the SFW tracks from the DWL.

In a further embodiment, a computer program product is provided for destage grouping for sequential fast write tracks using a processor device, in a computing environment. The computer-readable storage medium has computer-readable program code portions stored thereon. The computer-readable program code portions include a first executable portion that meters an amount of sequential fast write (SFW) tracks by providing an adjustable threshold for performing a destage scan that moves the SFW tracks from a SFW least recently used (LRU) list to a destaging wait list (DWL). Priorities are set for the destaging of the SFW tracks from the DWL.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As mentioned previously, contemporary computer storage systems are known to destage storage tracks from cache to long-term storage devices so that there is sufficient room in the cache for data to be written. In one embodiment, Wise Ordering for Writes (WOW), which are lists that are used for exploiting both temporal and spatial locality by ordering the list according to the storage location to which an associated task or request is directed, add a destaging task control blocks ("TCBs"), or simply "destaging tasks" one at a time. In one embodiment, destaging tasks are used to manage the movement of data within a data storage and retrieval system and between a host computer and the data storage and retrieval system. In other words, the destage TCBs are tasks that destage tracks from a cache to storage (e.g., disk drives). The destaging TCBs may be a command to start the destaging of the storage track.

However, for efficient destaging, destage grouping is important to prevent a RAID penalty (RAID-5 and RAID-6). For example, a destage of a single track for RAID-5 rank may cause 4 drive operations (e.g., read parity, read old data, destage new data, and destage new parity). If a full stripe is destaged, then a RAID controller does not need to fetch the old parity and old data, and only one drive operation is needed for the destage. Even in cases where full stripe cannot be grouped, it is beneficial to have as many tracks in stripe as possible since a RAID penalty is paid just once for N tracks instead of paying penalty for each track destage. For example, a stripe is a set of tracks on which parity is computed. For example, in a 6+p RAID-5 array, there are 6 disks of data and one disk of parity. Some fixed number of tracks from each disk are taken and parity is computed by XORing the data among those tracks. When all of the tracks of stripe are in cache then parity can be computed by simply XORing data between tracks of that stripe. But if only few tracks of the stripe are in cache then parity cannot be computed from just those tracks in cache. To compute the new parity, old data (for tracks that have been modified) and old parity is staged. New parity can now be computed by seeing the difference in old data and new data and looking at the old parity. Since the old data is staged and old parity to destage modified data, there are several more drive operations. This is known as RAID penalty. If, for example, there are N tracks of a stride in cache, and if a decision is made to destage each track separately, then each destage will have to pay the RAID penalty. Instead if destaged all the tracks in one destage then the RAID penalty is paid just once.

When data is arranged in a LRU (Least Recently Used) fashion and there are several tasks trying to destage at once, grouping may become complex as these tasks may compete with one another for the same set of tracks making the destage grouping sub-optimal.

Thus, a need exists for destage grouping for sequential fast write tracks. In other words, the present invention provides a solution for optimally grouping tracks from an LRU list for destaging. The sequential fast write (SFW) tracks are sequentially written and do not have a copy in NVS, which are used for PPRC initial copy. PPRC primary sends the track to cache and these tracks may not be in order i.e. track 2 can come before track 1. But the tracks are sequentially written to the secondary. So the LRU list will have all tracks for the volumes but they may not be necessarily in order and some tracks may come later.

Thus, a need exist for optimally grouping tracks from an LRU list for destaging. In one embodiment, a destage task may have just one track to destage, but the destage scan task may have more than one track to destage. In one embodiment, grouping is having a group of tracks for a destage task.

To address these inefficiencies, the present invention provides a solution for grouping tracks for destaging using a processor device in a computing environment. In one embodiment, by way of example only, tracks are selected for destaging from a least recently used (LRU) list and the selected tracks are moved to a destaging wait list. In one embodiment, a LRU list is a list of tracks ordered in a Least Recently used fashion. The selected tracks are grouped and destaged from the destaging wait list. In other words, the present invention picks only certain tracks (e.g., a first track of the stride) for destaging from the LRU list whenever possible (e.g., there are cases where first track is not in cache or not modified or not fully in cache thus the present invention cannot move the first track to the separate list). In other words, at least one track of the stride is picked and moved onto another list where destage TCBs are doing the grouping. Thus, two destage TCBs will not be able to do grouping on the same stride at the same time. For example, the certain tracks may be the last track, or second track, or third track and the like, and present invention just wants one track of the stride on this separate list.

The present invention moves these selected tracks to a new list (e.g., a destage waiting list) and then groups the tasks for destaging from this new destage waiting list. In one embodiment, the destage wait list (or destage waiting list) is a list of tracks waiting to be destaged. Also, as used herein, in one embodiment, by way of example only, a destage scan task is a task that may go through an LRU list and locates tracks that may be destaged and moves them to the destage wait list (DWL) list.

In addition to the solutions stated above, in one embodiment, the present invention provides the following elements. 1) SFW destage metering and the present invention meters the amount of SFW for destage scans. If there are no new SFW writes, the adjustable threshold for destage of SFW is decreased. If there are new SFW writes then the present invention increases the adjustable threshold until the adjustable threshold hits 15% of the overall SFW threshold. The present invention performs the destage scans if tracks on SFW LRU list are more than this threshold. In one embodiment, the goal of the present invention is to accumulate enough tracks in a cache to be able to do full stride destages, but also empty out SFW tracks when there are no more writes coming. 2) The destage scan moves tracks from SFW LRU list to Destage Wait List (DWL). This way the destage scans do not encounter same tracks over and over again on the SFW list. 3) The present invention only picks certain track numbers from a stride for starting destages (e.g., a first track in stride). Destage TCBs only pick tracks that are first in stride from the destage wait list when first in stride is present in cache and modified.

In one embodiment, the present invention provides for destage grouping for sequential fast write tracks using a processor device in a computing environment. In one embodiment, by way of example only, an amount of sequential fast write (SFW) tracks are metered by providing an adjustable threshold for performing a destage scan that moves the SFW tracks from a SFW least recently used (LRU) list to a destaging wait list (DWL). Priorities (e.g., high priority, normal priority, no priority for destage scans, etc.) are set for the destaging of the SFW tracks from the DWL. In one embodiment, there are priorities of destaging; High priority and normal priority. High priority is when there is two times the adjustable threshold (e.g., 2*adjustable threshold), otherwise its normal priority.

In one embodiment, the present invention performs the destaging scan if the SFW tracks on the SFW LRU list is more than the threshold. The threshold for destaging the SFW tracks is decreased if there are no new SFW writes.

In one embodiment, the present invention sets the threshold to a maximum threshold as an Nth percentage of an overall number of the SFW tracks allowed, commences a monitoring operation using the maximum threshold for the metering, sets a bit at a predetermined time interval if there are no new SFW writes and decrementing the maximum threshold by a predetermined Nth percentage, wherein the decrementing ceases at a zero threshold, and resets the bit if the bit is set and incrementing the threshold by the predetermined Nth percentage, wherein the bit is set to five (5) percent (%) if the threshold is less than five (5) percent (%) of the threshold.

In one embodiment, the present invention performs the destage scan in a high priority mode if a number of the SFW tracks on the SFW LRU list is greater than at least 2 times the threshold, executes the destage scan in a normal priority mode if the number of the SFW tracks on the SFW LRU list is greater than the threshold, and/or prohibits the destage scan if the number of the SFW tracks on the SFW LRU list is less than the threshold.

In one embodiment, the present invention determines via the destaging scan task if a first SFW track in a stride is located in a cache and has been modified. If the first SFW track in a stride is located in the cache and has been modified, selecting the first SFW track in the stride located in the DWL for destaging.

In one embodiment, the present invention locates a first SFW track and a last SFW track from the group of selected SFW tracks of the destaging wait list, the destaging is commenced from the first SFW track in the group of selected SFW tracks, and/or a SFW track is added to the group of selected SFW tracks if the SFW track is modified and/or located in a cache, otherwise the present invention moves to a next one of the selected SFW tracks in the group of selected tracks.

Figure 1:
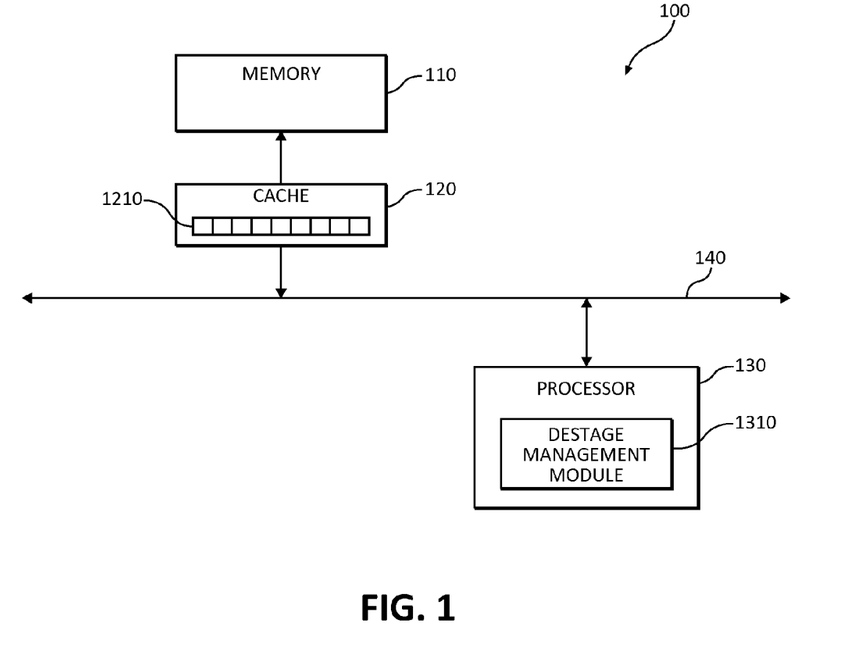
FIG. 1 illustrates is a block diagram showing an exemplary hardware structure for smoothing destaging tasks in which aspects of the present invention may be realized.

Turning to FIG. 1, a block diagram of one embodiment of a system 100 for destage grouping for sequential tracks. At least in the illustrated embodiment, system 100 comprises a memory 110 coupled to a cache 120 and a processor 130 via a bus 140 (e.g., a wired and/or wireless bus).

Memory 110 may be any type of memory device known in the art or developed in the future. Examples of memory 110 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing. In the various embodiments of memory 110, storage tracks are capable of being stored in memory 110. Furthermore, each of the storage tracks can be destaged to memory 110 from cache 120 when data is written to the storage tracks.

Cache 120, in one embodiment, comprises a write cache partitioned into one or more ranks 1210, where each rank 1210 includes one or more storage tracks. Cache 120 may be any cache known in the art or developed in the future.

During operation, the storage tracks in each rank 1210 are destaged to memory 110 in a foreground destaging process after the storage tracks have been written to. That is, the foreground destage process destages storage tracks from the rank(s) 1210 to memory 110 while a host (not shown) is actively writing to various storage tracks in the ranks 1210 of cache 120. Ideally, a particular storage track is not being destaged when one or more hosts desire to write to the particular storage track, which is known as a destage conflict. In various embodiments, processor 130 comprises or has access to a destage management module 1310, which comprises computer-readable code that, when executed by processor 130, causes processor 130 to perform the present invention.

Processor 130, in various embodiments, is configured to monitor each rank 1210 in cache 120 and determine the amount of storage tracks each respective rank 1210 is storing with respect to its allocated amount of storage space in cache 120. In one embodiment, processor 130 is configured to determine the amount of storage tracks in each respective rank 1210 on a percentage basis. That is, processor 130 is configured to monitor each rank 1210 and determine the percentage each respective rank 1210 is using to store storage tracks with respect to the individual allocations of the total storage space in cache 120.

In another embodiment, processor 130 is configured to determine the number of storage tracks in each respective rank 1210. Specifically, processor 130 is configured to monitor each rank 1210 and determine the number of storage tracks each respective rank 1210 is using to store storage tracks with respect to the individual allocations of the total storage space in cache 120.

Processor 130, in various embodiments, is configured to destage storage tracks from each respective rank 1210 until a predetermined minimum amount of storage space remains in each respective rank 1210 with respect to its predetermined allocated amount of storage space in cache 120, and then cease to or no longer destage storage tracks from ranks 1210 that are using less than or equal to the predetermined minimum amount of storage space. In one embodiment, processor 130 is configured to destage storage tracks from each rank 1210 until a predetermined percentage (e.g., thirty percent (30%)) of the predetermined amount of storage space in cache 120 is reached. In another embodiment, processor 130 is configured to destage storage tracks from each rank 1210 until a predetermined minimum number of storage tracks are reached.

Processor 130, in various embodiments, is configured to utilize a formula to determine the number of destage tasks to utilize when destaging storage tracks from each respective rank 1210. In the various embodiments, the formula is based on the global pressure factor of cache 120 as it relates to each respective rank 1210. That is, the number of destage tasks utilized to destage storage tracks from each respective rank 1210 is proportional to the amount of its allocated storage space each respective rank 1210 is multiplied by the global pressure factor, which is a factor determined by a collective percentage of the total amount of storage space in cache 120 being utilized by ranks 1210.

In one embodiment, the formula includes a predetermined maximum number destage tasks (e.g., forty (40) destage tasks) that is utilized when a particular rank 1210 is utilizing a large amount of its allocated storage space and the global pressure factor is high. In another embodiments, the formula includes a default of zero (0) destage tasks that is utilized when a particular rank 1210 is utilizing an amount of storage space less than or equal to the predetermined minimum amount with respect to its allocated amount of storage space in cache 120.

Processor 130, in various embodiments, is configured to select tracks for destaging from a least recently used (LRU) list and move the selected tracks to a destaging wait list. The selected tracks, via the processor 130, are grouped and destaged from the destaging wait list.

Figure 2:
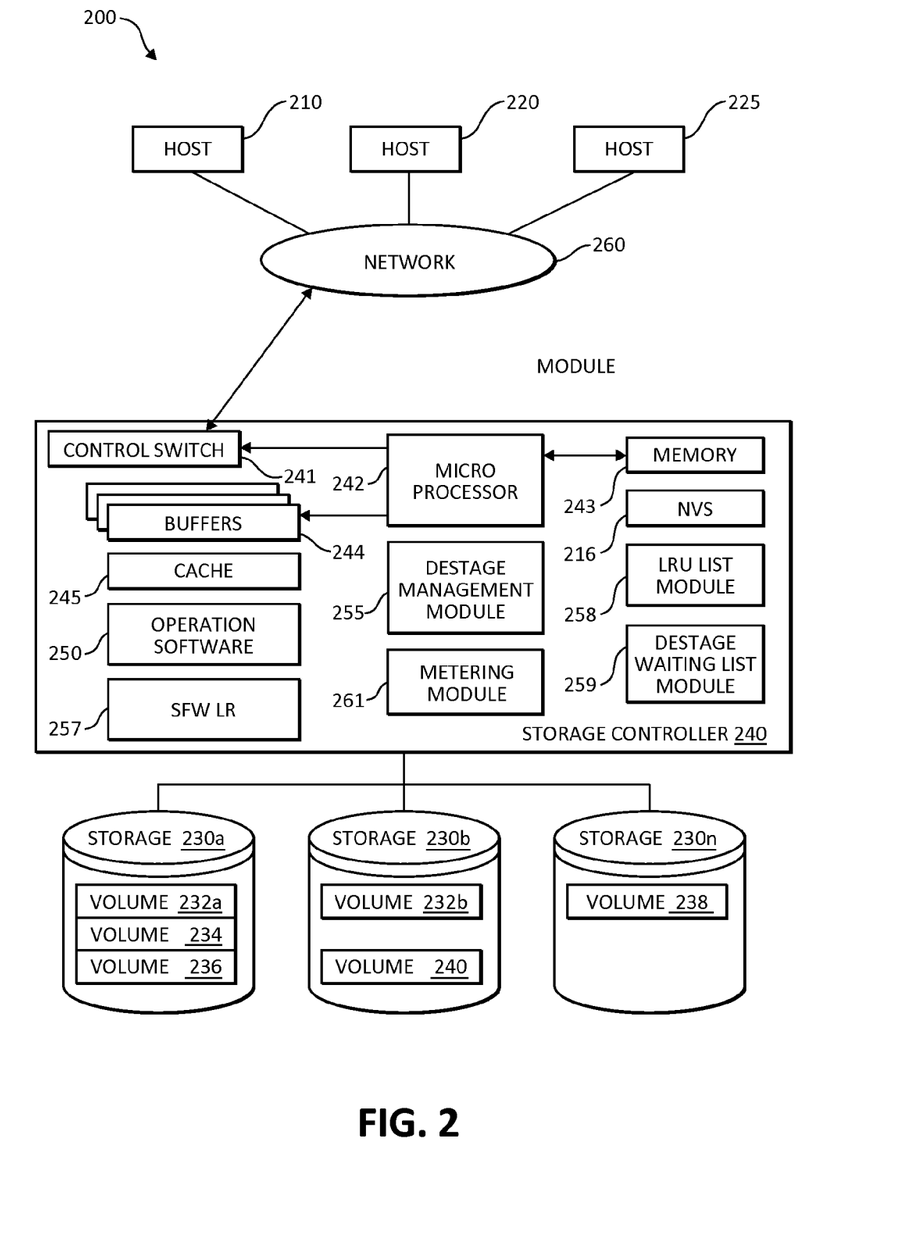
FIG. 2 is a block diagram showing an exemplary hardware structure of a data storage system in a computer system according to the present invention in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controller 240 and storage 230. In one embodiment, the embodiments described herein may be applicable to a variety of types of computing architectures, such as in a virtual cluster management environment using the various embodiments as described herein.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores the operation software 250, program instructions and data, which the processor 242 may access for executing functions and method steps associated with managing storage 230, and executing the steps and methods of the present invention. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a destage management module 255, a selection module 257 (e.g., a SFW track selection module), a least recently used (LRU) list module 258 (which may include, contain, and/or be in association with a separate SFW LRU list module), a destage waiting list (DWL) module 259, and a metering module 261 (e.g., a SFW metering module). The destage management module 255, the selection module 257, the LRU list module 258, the destage waiting list module 259, and the metering module 261 may be one complete module functioning simultaneously or separate modules. The destage management module 255, the selection module 257, the LRU list module 258, the destage waiting list module 259, and the metering module 261 may have some internal memory (not shown) and may store unprocessed, processed, or "semi-processed" data. The destage management module 255, the selection module 257, the LRU list module 258, the destage waiting list module 259, and the metering module 261 may work in conjunction with each and every component of the storage controller 240, the hosts 210, 220, 225, and other storage controllers 240 and hosts 210, 220, and 225 that may be remotely connected via the storage fabric 260. Both the destage management module 255, the selection module 257, the LRU list module 258, the destage waiting list module 259, and the metering module 261 may be structurally one complete module or may be associated and/or included with other individual modules. The destage management module 255, the selection module 257, the LRU list module 258, the destage waiting list module 259, and the metering module 261 may also be located in the cache 245 or other components of the storage controller 240.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, a control switch 241 for controlling a protocol to control data transfer to or from the destage management module 255, the selection module 257, the LRU list module 258, the destage waiting list module 259, and the metering module 261 in which information may be set. Multiple buffers 244 may be implemented to assist with the methods and steps as described herein.

In one embodiment, the host computers or one or more physical or virtual devices, 210, 220, 225 and the storage controller 240 are connected through a network adaptor (this could be a fibre channel) 260 as an interface i.e., via a switch called "fabric." The microprocessor 242 may control the memory 243 to store command information from the cluster host/node device (physical or virtual) 210 and information for identifying the cluster host/node device (physical or virtual) 210. The control switch 241, the buffers 244, the cache 245, the operating software 250, the microprocessor 242, memory 243, NVS 216, the destage management module 255, the selection module 257, the LRU list module 258, the destage waiting list module 259, and the metering module 261 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

Figure 3:
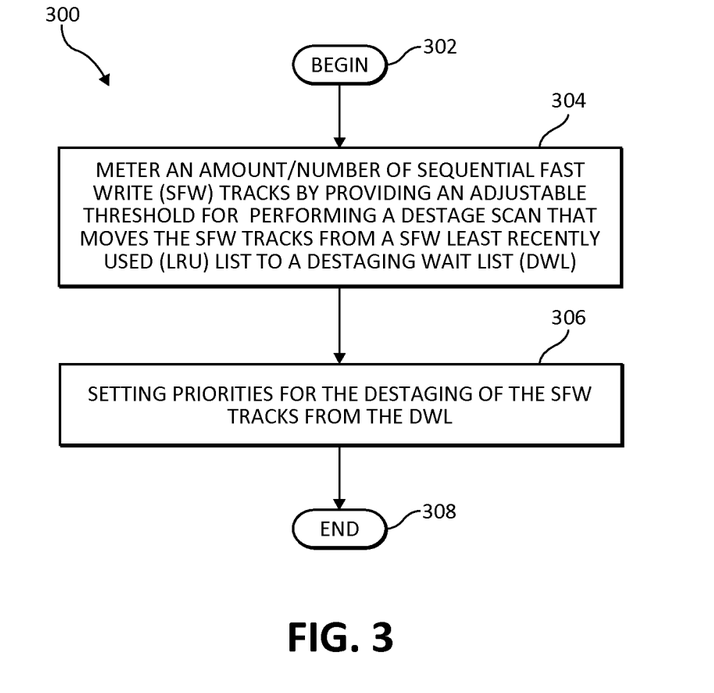
FIG. 3 is a flowchart illustrating an exemplary method for destage grouping for sequential fast write tracks in which aspects of the present invention may be realized.

Turning to FIG. 3, a flowchart illustrates an exemplary method 300 for destage grouping for sequential fast write tracks is depicted. The method 300 begins (step 302). The method 300 starts by metering destage grouping for sequential fast write tracks (step 304). The method 300 sets priorities for the destaging of the SFW tracks from the DWL (step 306). The method 300 ends (step 308).

SFW Destage Metering/Threshold

Figure 4:
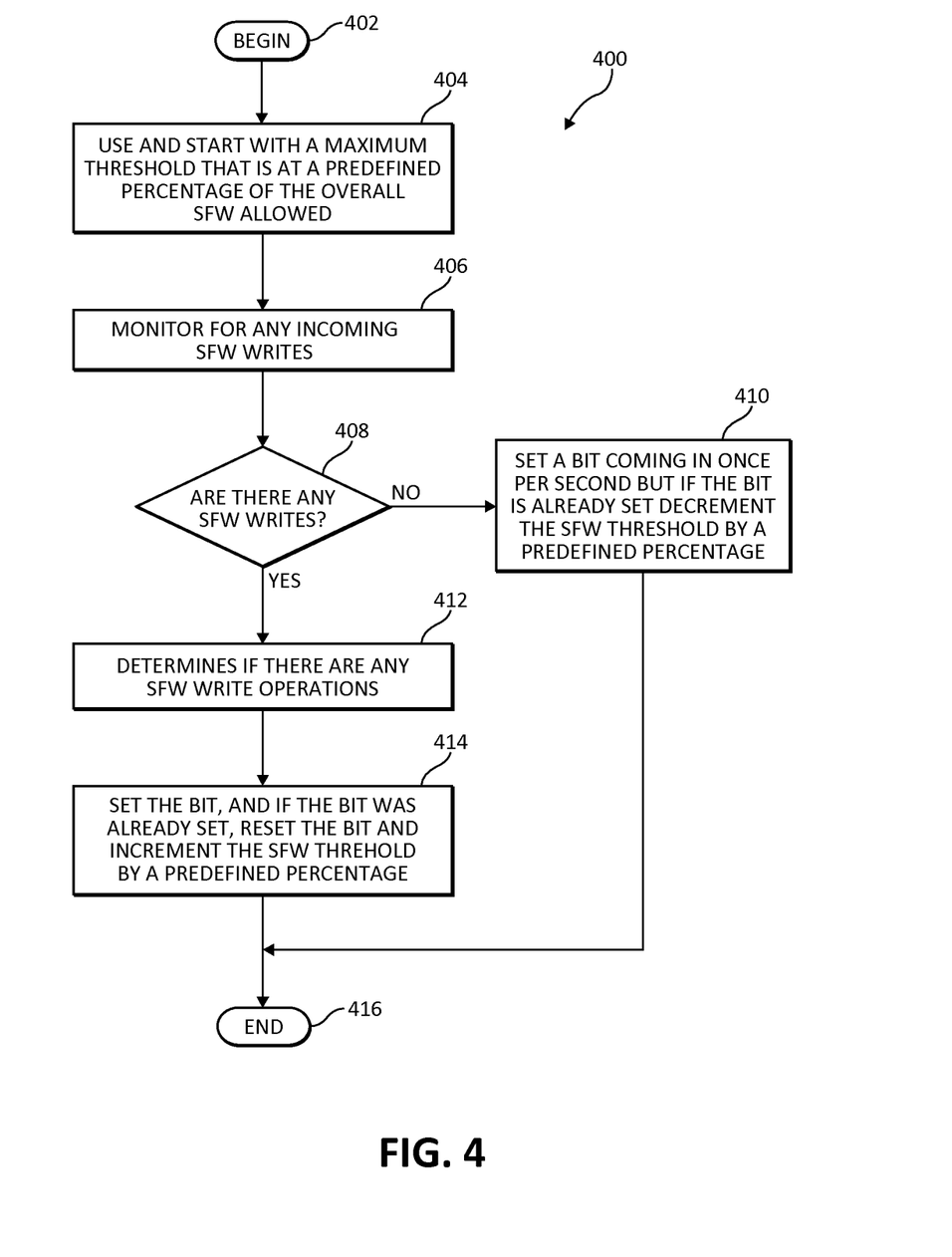
FIG. 4 is a flow chart illustrating an exemplary method for destage metering in which aspects of the present invention may be realized.

In one embodiment, the present invention provides an algorithm for SFW destage metering/threshold. Turning now to FIG. 4, flowchart illustrates an exemplary method 400 for destage metering is depicted. The method 400 begins (step 402) using and starting with a maximum threshold that is at a predefined percentage of the overall SFW allowed in the box (e.g., storage controller) (step 404). In one embodiment, the maximum threshold is 15% of the overall SFW allowed and starts with this 15% threshold. The method 400 monitors any SFW writes coming to the box (step 406). The method 400 determines, from the monitoring operation, if there are any incoming SFW writes (step 408). If no, the method 400 sets a bit once per second but if the bit was already set, the method 400 decrements the SFW threshold by a predefined percentage (e.g., 1%) (note: the method 400 will stop at zero. In other words, the method decrements if it sees that bit is already set (means no new I/O in last one sec). So every 1 second, if the bit was already set then the method knows there were no PO's and the method keeps decrementing it till it goes to zero) (step 410). (It should be noted that a bit is set every second to say there are no new writes. If there's a new write, it'll reset the bit.) If there are incoming SFW writes, the method 400 determines if there are any SFW write operations (step 412). If yes, the method 400 will set the bit, and if the bit was already set, the method 400 resets the bit and increments the SFW threshold by a predefined percentage (e.g., 1%) (note: if the threshold is less than 5%, the method 400 will set the bit to 5%) (step 414). If no, the method ends (the method also ends from step 414) (step 416).

Destage Scans

In one embodiment, by way of example only, the present invention performs destage scanning of the SFW tracks. In one embodiment, if the number of SFW tracks on SFW LRU list is greater than a predefined number or calculated value than the SFW destage threshold (e.g., greater than 2 times than the SFW destage threshold), then the present invention performs a destage scan in high priority mode. However, if the number of SFW tracks on SFW LRU list is greater than the SFW destage threshold, then the present invention destage scans in normal priority. If the number of SFW tracks on SFW LRU list less than SFW destage threshold, the present invention does not perform/execute a destage scan. In one embodiment, a destage scan will start scanning a LRU list of SFW tracks and move the SFW tracks to DWL. In one embodiment, the present invention moves everything including non-first in stride SFWs to the destage wait list. The goal of the present invention is prevent scanning the same tracks on SFW LRU list and skipping them over and over again.

Figure 5:
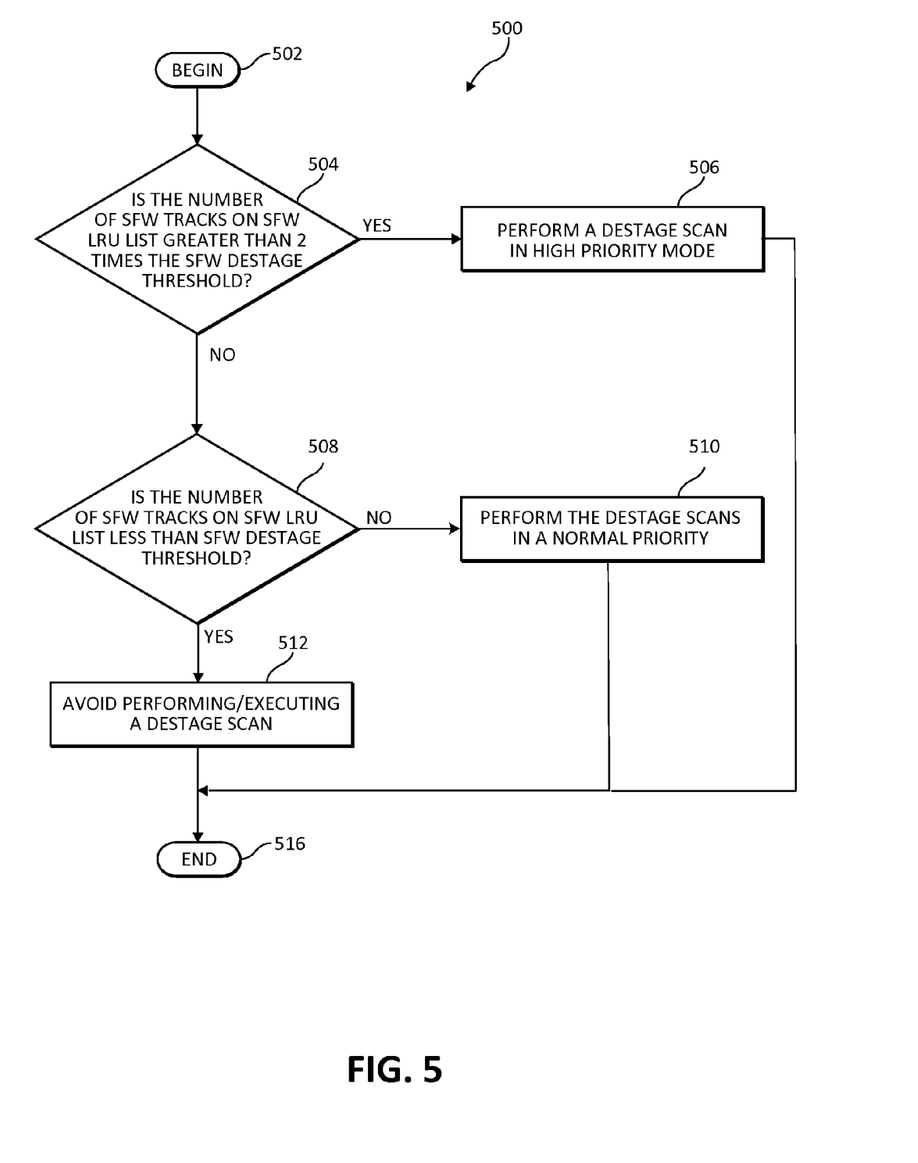
FIG. 5 is a flow chart illustrating an exemplary method for performing destage scans in which aspects of the present invention may be realized.

Turning to FIG. 5, a flowchart illustrates an exemplary method 500 for performing destage scans is depicted. The method 500 begins (step 502). The method 500 determines if the number of SFW tracks on SFW LRU list is greater (and/or equal to) 2 times the SFW destage threshold (step 504). If yes, then the method 500 performs a destage scan in high priority mode (step 506). If no, the method 500 determines if the number of SFW tracks on SFW LRU list is less than SFW destage threshold (step 508). If no, the method 500 performs the destage scans in normal priority (step 510). If yes, the method 500 avoids performing and/or executing a destage scan (step 512). The method 500 ends (step 514). Also, from step 506 and 512, the method ends (step 516).

Destage Scans

In one embodiment, by way of example only, destage TCBs will pick a SFW track from scanning the DWL as follows. If the SFW track is first track of the stride then the present invention picks this SFW track, otherwise, if the first track of the stride is in cache and modified then skip this track, otherwise the present invention picks this track. "This track" refers to the track picked for destage. It could also be track anywhere in the stride.

Figure 6:
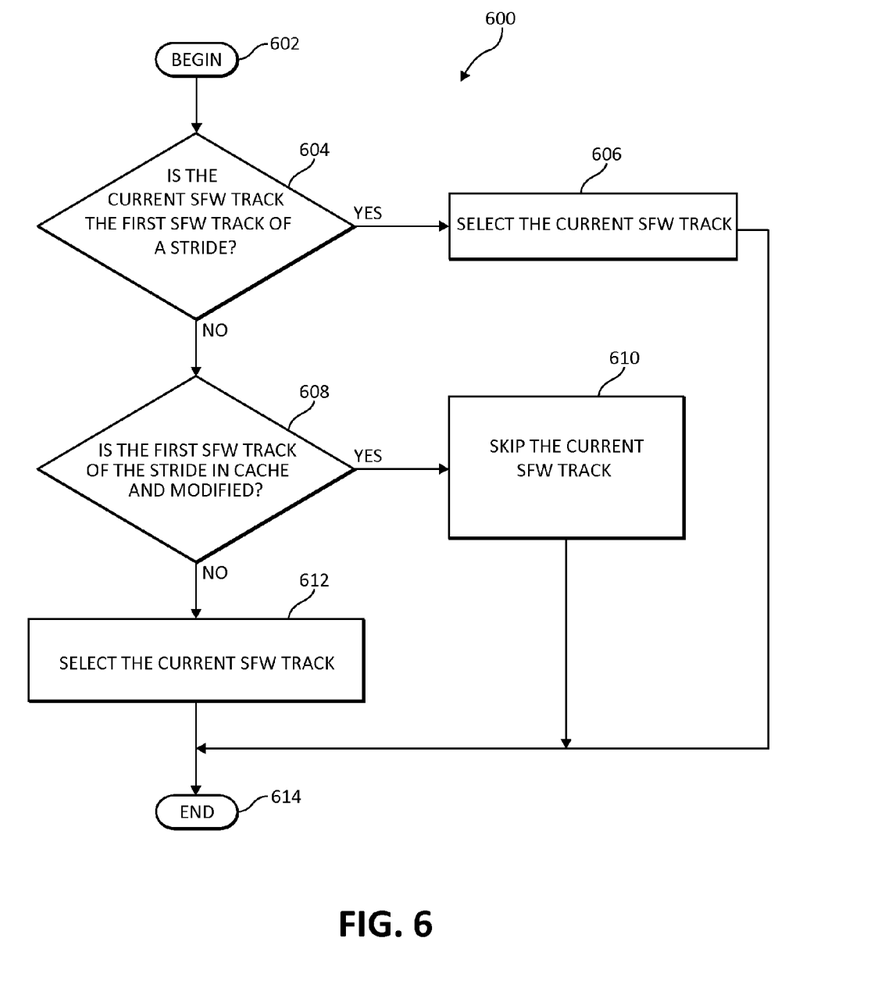
FIG. 6 is a flow chart illustrating an exemplary method for destaging task control blocks (TCB) in which aspects of the present invention may be realized.

Turning to FIG. 6, a flowchart illustrates an exemplary method 600 for destaging task control blocks (TCB) is depicted. The method 600 begins (step 602). The method 600 begins by determining if the current SFW track is the first SFW track of a stride (step 604). If yes, then the method 600 selects the current SFW track (step 606). If no, the method 600 determines if the first SFW track of the stride is in cache and modified (step 608). If yes, the method 600 will skip the current SFW track (step 610). If no, the method 600 will select the current SFW track (step 612). The method 600 ends (step 614). Also, the method 600 ends from steps 606 and 610.

Destage Grouping

In one embodiment, by way of example only, destage grouping is performed after a destage TCB picks a SFW track for destage, as illustrated above in FIG. 6. Destage Grouping for SFW tracks is performed as follows. 1) The present invention determines and identifies (e.g., finds out) the first and last in stride. 2) The present invention starts from the first SFW track in stride. 3) If the SFW track is in cache and modified, the SFW track is added to the destage group, otherwise the present invention move to the next SFW track in the group. 4) However, if the SFW track that is in the cache and has been modified is the last track of the stride destaging is completed.

Figure 7:
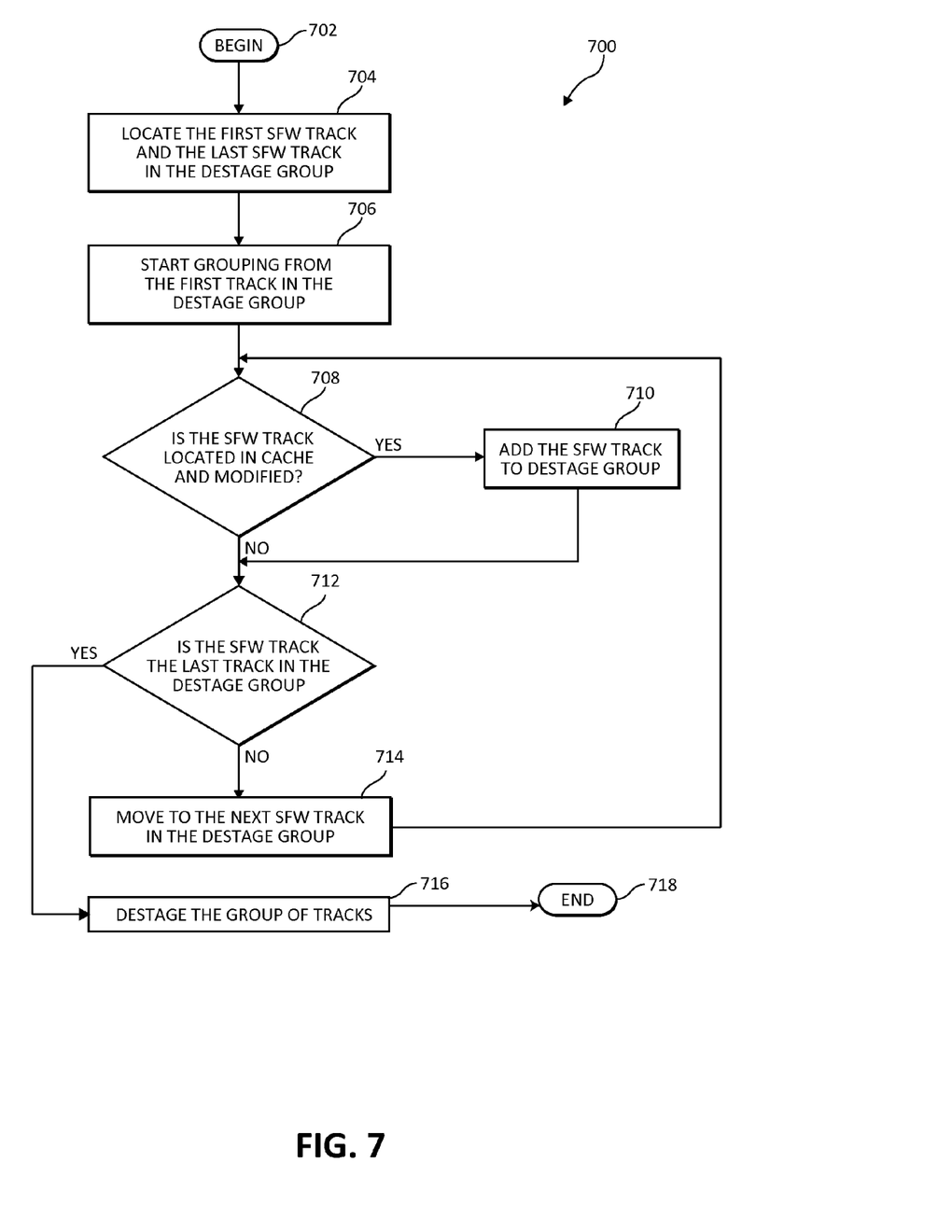
FIG. 7 is a flow chart illustrating an exemplary method for destage grouping in which aspects of the present invention may be realized.

Turning to FIG. 7, a flowchart illustrates an exemplary method 700 for destage grouping is depicted. FIG. 7 illustrates adding SFW tracks to the destage group until the last track in the destage group is reached and grouped. Once the last track is reached, then the present invention destages the group. The method 700 begins (step 702) by locating the first SFW track and the last SFW track in the destage group (step 704). The method 700 starts grouping from the first track in the destage group (step 706). The method 700 then determines if the SFW track is located in cache and modified (step 708). If yes, the method 700 adds the SFW track to the destage group (step 710). If no, the method 700 then determines if the SFW track is the last track in the destage group (step 712). If no, the method 700 moves to the next SFW track in the destage group (step 714) and then returns to step 708. If yes, the method 700 destages the group of SFW tracks (step 716). The method 700 ends (step 718).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc. operated by a processor device) and/or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium (e.g., non-transitory computer-readable storage medium) or a computer readable storage medium (e.g., a non-transitory computer-readable storage medium). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It will also be noted that each block of the block diagrams and/or flowchart illustration, and combinations of blocks in the block diagrams and/or flowchart illustration, is implemented individually as one individual component or aspect of the present invention and/or implemented in combination with each other thereby forming the present invention as one complete block diagram and/or flowchart illustration.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for destage grouping for sequential fast write tracks by a processor device in a computing environment, the method comprising:
   metering an amount of sequential fast write (SFW) tracks by providing an adjustable threshold for performing a destage scan that moves the SFW tracks from a SFW least recently used (LRU) list to a destaging wait list (DWL);
   setting priorities for the destaging of the SFW tracks from the DWL;
   setting the adjustable threshold to a maximum threshold as an Nth percentage of an overall number of the SFW tracks allowed;
   commencing a monitoring operation using the maximum threshold for the metering;
   setting a bit at a predetermined time interval if there are no new SFW writes and decrementing the maximum threshold by a predetermined Xth percentage, wherein the Xth percentage is lower than the Nth percentage and the decrementing ceases at a zero threshold; and
   resetting the bit if the bit is set and incrementing the adjustable threshold by the predetermined Nth percentage.

2. The method of claim 1, further including performing the destaging scan if the number of SFW tracks on the SFW LRU list is more than the adjustable threshold.

3. The method of claim 1, further including decreasing the adjustable threshold for destaging the SFW tracks if there are no new SFW writes.

4. The method of claim 1, further including performing at least one of:
   performing the destage scan in a high priority mode if a number of the SFW tracks on the SFW LRU list is greater than at least 2 times the adjustable threshold,
   executing the destage scan in a normal priority mode if the number of the SFW tracks on the SFW LRU list is greater than the adjustable threshold, and
   prohibiting the destage scan if the number of the SFW tracks on the SFW LRU list is less than the adjustable threshold.

5. The method of claim 1, further including determining via the destaging scan task if a first SFW track in a stride is located in a cache and has been modified, wherein:
   if the first SFW track in a stride is located in the cache and has been modified, selecting the first SFW track in the stride located in the DWL for destaging.

6. The method of claim 1, further including performing one of:
   locating a first SFW track and a last SFW track from the group of selected SFW tracks of the destaging wait list,
   commencing the destaging from the first SFW track in the group of selected SFW tracks, and
   adding a SFW track to the group of selected SFW tracks if the SFW track is one of modified and located in a cache, otherwise:
   moving to a next one of the selected SFW tracks in the group of selected tracks.

7. A system for destage grouping for sequential fast write tracks in a computing environment, the system comprising:
   at least one processor device operable in the computing storage environment, wherein processor device:
   meters an amount of sequential fast write (SFW) tracks by providing an adjustable threshold for performing a destage scan that moves the SFW tracks from a SFW least recently used (LRU) list to a destaging wait list (DWL);
   sets priorities for the destaging of the SFW tracks from the DWL;
   sets the adjustable threshold to a maximum threshold as an Nth percentage of an overall number of the SFW tracks allowed;
   commences a monitoring operation using the maximum threshold for the metering;
   sets a bit at a predetermined time interval if there are no new SFW writes and decrementing the maximum threshold by a predetermined Xth percentage, wherein the Xth percentage is lower than the Nth percentage and the decrementing ceases at a zero threshold; and
   resets the bit if the bit is set and incrementing the adjustable threshold by the predetermined Nth percentage.

8. The system of claim 7, wherein the at least one processor device performs the destaging scan if the number of SFW tracks on the SFW LRU list is more than the adjustable threshold.

9. The system of claim 7, wherein the at least one processor device decreases the adjustable threshold for destaging the SFW tracks if there are no new SFW writes.

10. The system of claim 7, wherein the at least one processor device performs at least one of:
    performing the destage scan in a high priority mode if a number of the SFW tracks on the SFW LRU list is greater than at least 2 times the adjustable threshold,
    executing the destage scan in a normal priority mode if the number of the SFW tracks on the SFW LRU list is greater than the adjustable threshold, and
    prohibiting the destage scan if the number of the SFW tracks on the SFW LRU list is less than the adjustable threshold.

11. The system of claim 7, wherein the at least one processor device determines via the destaging scan task if a first SFW track in a stride is located in a cache and has been modified, wherein:
    if the first SFW track in a stride is located in the cache and has been modified, selecting the first SFW track in the stride located in the DWL for destaging.

12. The system of claim 7, wherein the at least one processor device performs one of:
    locating a first SFW track and a last SFW track from the group of selected SFW tracks of the destaging wait list,
    commencing the destaging from the first SFW track in the group of selected SFW tracks, and
    adding a SFW track to the group of selected SFW tracks if the SFW track is one of modified and located in a cache, otherwise:
    moving to a next one of the selected SFW tracks in the group of selected tracks.

13. A computer program product for destage grouping for sequential fast write tracks in a computing environment by a processor device, the computer program product comprising a non-transitory computer-readable storage medium having computer-readable program code portions stored therein, the computer-readable program code portions comprising:
    a first executable portion that meters an amount of sequential fast write (SFW) tracks by providing an adjustable threshold for performing a destage scan that moves the SFW tracks from a SFW least recently used (LRU) list to a destaging wait list (DWL);

a second executable portion that sets priorities for the destaging of the SFW tracks from the DWL;

a third executable portion that sets the adjustable threshold to a maximum threshold as an Nth percentage of an overall number of the SFW tracks allowed;

a fourth executable portion that commences a monitoring operation using the maximum threshold for the metering;

a fifth executable portion that sets a bit at a predetermined time interval if there are no new SFW writes and decrementing the maximum threshold by a predetermined Xth percentage, wherein the Xth percentage is lower than the Nth percentage and the decrementing ceases at a zero threshold; and a sixth executable portion that resets the bit if the bit is set and incrementing the adjustable threshold by the predetermined Nth percentage.

14. The computer program product of claim 13, further including a seventh executable portion that performs the destaging scan if the number of SFW tracks on the SFW LRU list is more than the adjustable threshold.

15. The computer program product of claim 13, further including a seventh executable portion that decreases the adjustable threshold for destaging the SFW tracks if there are no new SFW writes.

16. The computer program product of claim 13, further including a seventh executable portion that performs at least one of:

performing the destage scan in a high priority mode if a number of the SFW tracks on the SFW LRU list is greater than at least 2 times the adjustable threshold, executing the destage scan in a normal priority mode if the number of the SFW tracks on the SFW LRU list is greater than the adjustable threshold, and prohibiting the destage scan if the number of the SFW tracks on the SFW LRU list is less than the adjustable threshold.

17. The computer program product of claim 13, further including a seventh executable portion that determines via the destaging scan task if a first SFW track in a stride is located in a cache and has been modified, wherein:

if the first SFW track in a stride is located in the cache and has been modified, selecting the first SFW track in the stride located in the DWL for destaging.

18. The computer program product of claim 13, further including a seventh executable portion that performs one of:

locating a first SFW track and a last SFW track from the group of selected SFW tracks of the destaging wait list, commencing the destaging from the first SFW track in the group of selected SFW tracks, and adding a SFW track to the group of selected SFW tracks if the SFW track is one of modified and located in a cache, otherwise:

moving to a next one of the selected SFW tracks in the group of selected tracks.

* * * * *